April 30, 1957     A. D. NORRIS     2,790,425
SAFETY STOP MECHANISM FOR GLASSWARE MAKING MACHINE
Filed Dec. 31, 1953     2 Sheets-Sheet 1
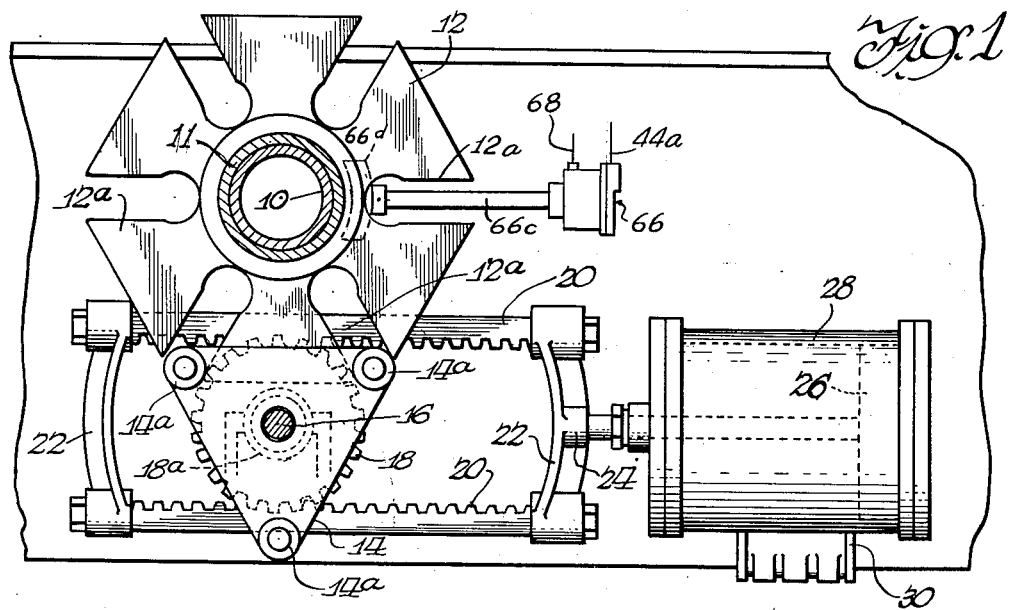
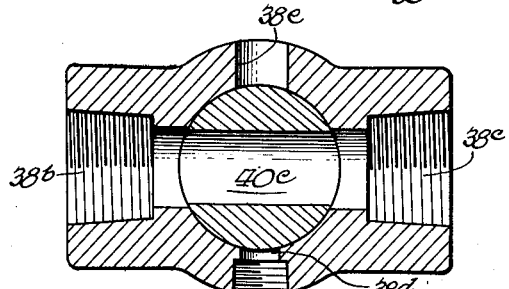
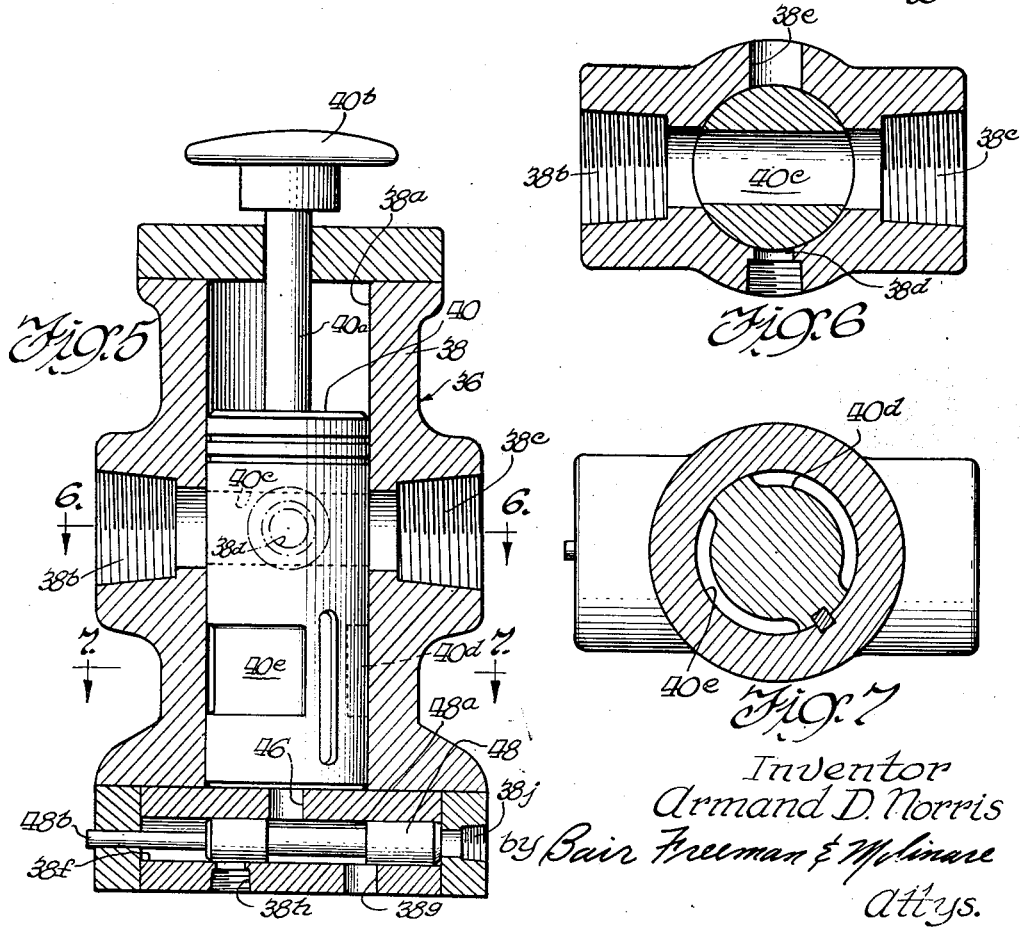
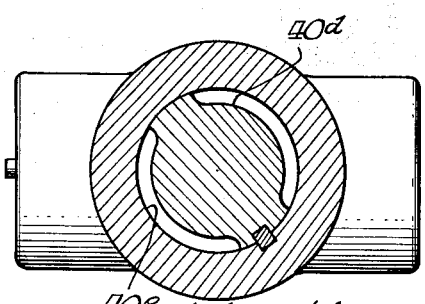
Inventor
Armand D. Norris
by Bair Freeman & Molinare
Attys.

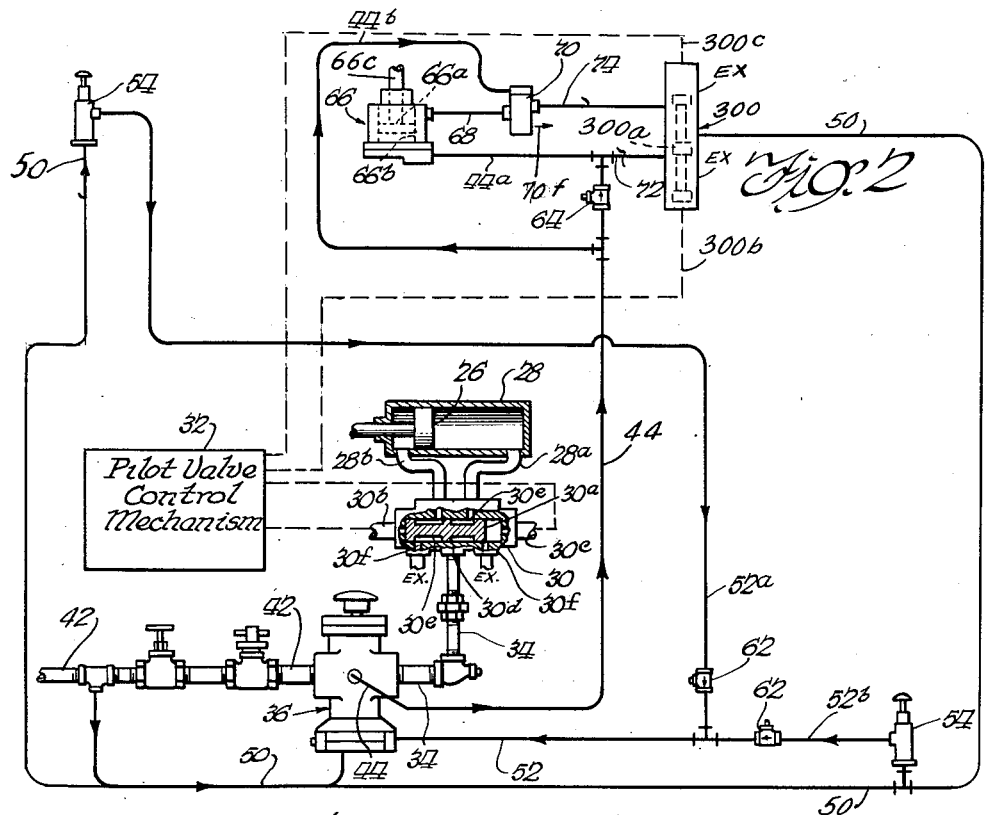
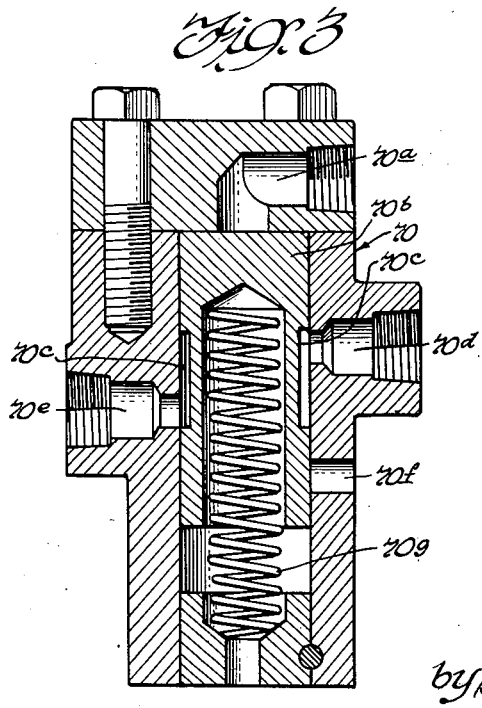
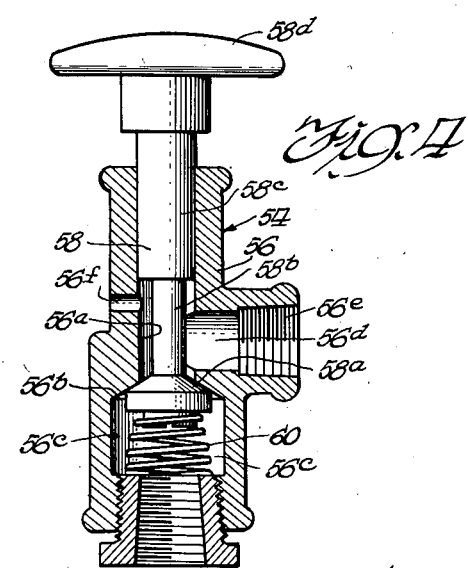

United States Patent Office 2,790,425
Patented Apr. 30, 1957

2,790,425

SAFETY STOP MECHANISM FOR GLASSWARE MAKING MACHINE

Armand D. Norris, Anderson, Ind., assignor to Lynch Corporation, Anderson, Ind., a corporation of Indiana Application December 31, 1953, Serial No. 401,609

6 Claims. (Cl. 121—40)

This invention relates to an improved glassware making machine having arresting mechanism operable from any one of many locations and effective when actuated to stop the machine immediately and hold it in the stopped position until reset.

In glassware making machines, such as that shown in Edward G. Bridges Patents Nos. 2,015,662 and 2,336,162, each entitled, "Glassware Forming Machine" and assigned to the same assignee as the present invention, a reciprocable member is actuated recurrently to cause step by step motions of the glassware in the various stages of formation. During the periods of dwell, the various glassware forming operations are conducted. In machines of this type it occasionally happens that the machine operation is faulty, someone is injured or in a dangerous position with respect to the machine, or for some other reason, machine operation should be interrupted immediately.

In the structure described herein, the operation of the machine can be arrested by actuating any one of a plurality of safety valves located at appropriate points about the machine. Each valve is connected to the air source used in the machine and to a common outlet pipe so that actuation of any one of the valves applies pressure from the source to the pipe. The pressure thus available at the common outlet pipe actuates a control valve which performs two functions. First, it interrupts the supply of operating fluid to the piston which normally actuates the reciprocating member. Secondly, it applies fluid to a brake actuating mechanism to engage the same and thus the brake actuating mechanism opposes further motions of the machine. Thus, operating power is simultaneously interrupted and braking action is applied, bringing the machine to a stop even though part way through a motion of the reciprocating member and, in addition, brake force is applied to hold the reciprocating member in whatever position it may stop.

It is, therefore, a general object of the present invention to provide an improved mechanism to arrest the operation of a glassware making machine from any one of a plurality of stations located as desired about the machine.

A further object of the present invention is to provide an improved mechanism to arrest operation of a bottle making machine, which mechanism uses air from the machine's high pressure source for this purpose.

Additionally, it is an object of the present invention to provide a mechanism to arrest operation of a bottle making machine by disabling the machine actuating apparatus in a manner that does not interfere with the normal machine operating mechanism.

Further and more specific objects of the present invention are to provide a safety means to arrest operation of a glassware making machine that is flexible and can be applied to provide safety devices located at will about the machine, is reliable, utilizes the machine operating air to arrest operation, and is simple and easily constructed and maintained.

The novel features which I believe to be characteristic of my invention are set forth with particularity in the appended claims. My invention, itself, however, together with further objects and advantages thereof, will best be understood by reference to the following description taken in connection with the accompanying drawings, in which:

Figure 1 is a fragmentary, top plan view of a glassware making machine of the type to which the present invention is applicable;

Figure 2 is a somewhat diagrammatic view showing a safety mechanism constructed in accordance with the present invention and applicable to the machine of Figure 1;

Figure 3 is an enlarged view in cross-section of the bleeder valves shown in the apparatus of Figure 2;

Figure 4 is an enlarged view in cross-section of one of the trip valves shown in the mechanism of Figure 2;

Figure 5 is an enlarged view in cross-section, with parts in elevation, of the main operating valve of the mechanism of Figure 2; and Figures 6 and 7 are cross-sectional views through axes 6—6 and 7—7, of Figure 5.

Referring now to Figure 1, there is shown at 10 the main stationary supporting shaft for a turret 11 of a glassware making machine. Such turret has a series of glassware holding stations, in this case six, spaced at equal angular spacings. Glassware making apparatus coacts with glassware at each of these stations and during the period of turret dwell performs the various glassware forming operations. As the turret 11 rotates intermittently, the glassware is thus formed.

For example, at the first station in the rotation of the turret, the glassware may be deposited in a mold; at the second station, it may be partially formed; at a third station, the forming operation may be completed; and so on, until at the last station, the glassware is removed from the turret. In a complete glassware making machine, such as the bottle making machine of the Bridges patent, above referred to, a number of turrets may be interconnected to execute like intermittent motions and transfer the ware between them, as required for complete ware-forming operations. The necessary motions of the turrets in unison may be achieved, for example, by gearing the turret 11 to the other turrets.

In the apparatus of Figure 1, intermittent rotary motion is imparted to the turret 11 by a Geneva follower 12 which rotates on the shaft 10 and by a Geneva driver 14 which is carried by a shaft 16. The Geneva driver 14 is of triangular conformation and has three drive rollers 14a positioned to fit into the radial slots 12a of the follower 12. Thus, as the driver 14 is rotated, it tends to impart intermittent rotations to the turret, each intermittent rotation being 60° or one-sixth of a full rotation. The driver 14 is itself intermittently rotated by the gear 18, which is likewise affixed to the shaft 16. This gear is driven by the spaced parallel racks 20 which are held in spaced position for engagement with gear 18 by the yoke members 22. This entire assembly is carried by the piston rod 24 which is driven by the piston 26.

The racks 20 are in vertically spaced position so that at any one time one of them, but not both, engages the gear 18. The gear 18 is vertically lifted or depressed by the yoke mechanism, indicated generally at 18a, which supports gear 18 in relation to shaft 16 and is automatically actuated to lift the gear 18 or allow it to descend in accordance with machine operation.

The above described mechanism is shown and described in the Bridges patent above referred to. Briefly, however, when the piston 26 shifts in the left hand direction, the gear 18 is vertically positioned to engage the upper rack 20, as seen in the drawing. The traverse of the piston then rotates the gear 18 and the Geneva driver 14 one-third of a revolution, or 120°. This causes the roller 14a to fit into the corresponding slot 12a and rotate shaft 10 in an intermittent motion over 60°. The piston 26 then dwells in position while the ware-making operations take place. After the period of dwell, the gear 18 is shifted to engagement with the lowermost rack 20, as seen in Figure 1, and the piston 26 is driven by appropriate air pressure to its original position. This causes rotation of gear 18 in the same direction as before and moves the shaft 10 one further step in its angular rotation.

The piston 26 is located in a suitable cylinder 28 which has passages 28a and 28b, Figure 2, leading to a pilot valve 30. As shown in Figure 2, this valve has a piston 30a which is shifted within the valve by a pilot valve control mechanism 32. The latter mechanism is an arrangement of timer valves for the glassware making machine and is intermittently actuated to apply pressure through port 30b or port 30c to drive the piston 30a in one direction or the other, as required to control the machine. The pilot valve 30 normally receives air under pressure through port 30d, which is connected to pipe 34, and to a source of air as hereafter described. The piston 30a has a pair of spaced, circumferential grooves 30e which define a passage from the port 30d to one or the other of the ports 28a or 28b, depending upon whether piston 30a is at one extreme of its travel or is at the other extreme of its travel. Pilot valve 30 is further provided with exhaust ports 30f, each of which is connected to a point of low pressure air discharge by suitable pipes. These are so positioned as to mate with the groove 30e of the piston 30, which is not in communication with the high pressure port 30d. Thus, as the piston 30a is moved from one extreme position to the other, it applies pressure to one side of the piston 26 and permits air from the other side to exhaust.

As shown in Figure 2, the pipe 34 connects with the main control valve, indicated generally at 36. This valve, which is shown in detail in Figures 5 to 7, operates to apply pressure to the pipe 34 for normal machine operation. When it is desired to interrupt operation of the machine, the main control valve 36 connects pipe 34 to an air discharge, thereby removing the air pressure in that pipe for interrupting the supply of operating air to the pilot valve 30 and the piston 28, at which time the piston can no longer drive the racks 20 and thus, no longer impart rotations to the turrets.

The main control valve 36 consists of a housing 38 having a central cylindrical bore 38a which receives the operating piston 40. A stem 40a and operating knob 40b protrude upwardly from piston 40 and extend outside the housing 38 for manual operation. In the "down" position shown in Figure 5, the main control valve 36 defines a passage for high pressure air from the air supply pipe 42, Figure 1, to the pipe 34. This connection can be traced in Figure 5 from the threaded bore 38b to which the pipe 42 is connected, through the diametral passage 40c, Figure 6, of the piston 40, to the threaded bore 38c which receives the pipe 34.

When the piston 40 is in the "up" position, either by reason of actuation of the safety mechanism described herein, or by reason of the manual lifting of the piston 40 through the use of knob 40b, the diametral bore 40c no longer registers with the passage 38b and 38c. At this time, however, the partial circumferential grooves 40d and 40e of the piston register with the passages 38c and 38b, respectively. The groove 40e thereby defines a passage from the passage or port 38b (and hence, pipe 42, Figure 2) to the passage 38d which is threaded and receives the brake operating pipe 44. As hereafter described in detail, application of air under pressure from pipe 42 to pipe 44 actuates brake mechanism which holds turret 11, and hence, the machine, in fixed position.

When the piston 40 is in the "up" position, the groove 40d registers with the exhaust passage 38e of the housing 38. This groove thus defines an air escape passage from the passage or bore 38c (and hence, pipe 34) to the air escape port 38e.

Thus, when the piston 40 is in the "down" position, air pressure is applied to pipe 34 but not pipe 44. When the piston is in the "up" position, air can exhaust from pipe 34 and full pressure is applied to pipe 44.

The piston 40 is driven from the "down" position of Figure 5 to the "up" position by air admitted through the bottom port 46, Figure 5. Air is admitted through this port when the piston 48 is shifted from the right-hand position shown in Fig. 5 to the left hand position. This piston rides in the bore 38f and has a groove 48a in its face which, in the right hand position shown in Figure 5, defines a communication between the port or passage 46 and the exhaust passage 38g, while in the left hand position it defines a passage between the threaded bore 38h and the bore or passage 46. The passage 38h is threaded and receives the branch pipe 50, Figure 2, which is connected to the source of air at high pressure 42. Thus, when the piston 48 shifts to the left hand position above referred to, air is applied under pressure from branch pipe 50, through passage 38h, and the groove 48a on the piston 48 to the passage 46 and thereby lifts the piston 40.

The piston 48 is manually moved to the right hand position shown in Figure 5 by the push rod 48b which extends outside the housing 38. It is moved to the opposite extreme of travel by application of air under pressure to the pipe 52, which, in turn, is received in the threaded passage or bore 38j of the housing 38.

Under normal operating conditions, the pipe 52 is at atmospheric pressure. This results from the fact that once the piston 48 shifts to the left hand position, the passage 38j (and hence, pipe 52) is in communication with the exhaust passage 38g since air is no longer required on the piston 48 and the valves 54 may be merely "hit" and not held depressed. Likewise, the portions 52a and 52b of pipe 52 are at atmospheric pressure because the trip valves 54 define a communication between these parts of the pipe and the atmosphere, as hereinafter described. Thus, when the piston 48 is manually shifted, to the position of Figure 5, the pipe 52 has only a very slight increase, or no increase of pressure over atmospheric pressure.

The function of the trip valves 54 is to apply high pressure to the pipes 52a or 52b, as the case may be, and hence, to the pipe 52 to drive the piston 48 to the left hand position of Figure 5. Each of these valves consists of a housing 56 having a central bore 56a which is beveled at 56b to form a valve seat and communicates with the chamber 56c. A valve 58 having a conical seating member 58a, a stem 58b, and a piston 58c is received in the bore 56a. This valve has an operating knob 58d protruding above the housing 56. The valve 58 is biased to the seated or closed position by the spring 60 which seats at its upper end against the valve member 58a and at its lower end seats on the annular shoulder formed at the bottom portion of the cavity 56c. The cavity 56c receives air from the high pressure source 42 of the machine through the branch pipe 50, Figure 2, which is threadedly received in the housing 56 and communicates with the cavity 56c. The bore 56a is in communication with a side passage 56d which has a threaded end part 56e which receives the pipe 52b or 52a, as the case may be. A discharge port 56f is provided in the housing 56 at a position located above the passage 56d.

When the knob 58d is in the "up" position, the valve 58a seats on the seat 56b and applies no pressure to the passage 56d or the pipe 52a or 52b, as the case may be. However, when it is desired to arrest operation of the machine, the knob 58d can be depressed, thereby causing the valve 58a to move to spaced position in relation to the seat 56b and apply air from the branch pipe 50 to the passage 56d and pipe 52a and 52b, as the case may be. Simultaneously, the piston part 58c of the plunger 58 covers the air escape port 56f of valve 54. When pressure is applied to pipe 52a or to pipe 52b, that pressure is effective on pipe 52 since the check valves 62 operate to admit air from pipe 52a or pipe 52b to the pipe 52, although opposing air movement in the opposite direction so that the air from one valve 54 does not escape to atmosphere through the escape port 56f of another valve 54. This drives the piston 48, Figure 5, to the left hand position and thereby applies pressure to pipe 44 and relieves the pressure in pipe 34, as above described.

The trip valves 54 may be located at any point about the machine. Moreover, any number of such valves may be provided, each being connected by branch pipe 50 to high pressure supply pipe 42 on one hand, and to an outlet pipe connected through a check valve to the pipe 52.

When pressure is applied to pipe 44, it is effective through the check valve 64 and pipe 44a to actuate a brake actuating mechanism shown generally at 66. This mechanism is a fluid-operated brake such as shown in Bridges Patent No. 2,336,162 (at 84, 85, 86, 87 in Fig. 1 thereof) having a piston 66a which moves under pressure applied from pipe 44a to a brake-applying position with respect to the Geneva follower 12. This piston is located in a bore 66b which, at one end, is in communication with pipe 44a, and at the opposite end is in communication with pipe 68. As shown diagrammatically in Fig. 1, a piston rod 66c extends from the piston 66a and has a brake shoe 66d to engage the turret 11 to represent the application of braking action. In Fig. 2, a pilot valve 300 similar to the pilot valve 30 connects to the pipes 72 and 74 of the brake actuating mechanism 66 and has a piston 300a shifted by applying pressure through ports 300b and 300c from the pilot valve control mechanism 32 in a manner similar to the operation of the pilot valve 30 and as disclosed in Bridges Patent No. 2,336,162 at 80. The pilot valve 300 is, of course, properly timed in relation to the pilot valve 30 by the mechanism or timer 32.

Pressure applied to pipe 44 is also effective through pipe 44b to actuate the bleeder valve 70 which is shown in enlarged view in Figure 3. Pressure from the pipes 44 and 44b is applied to the control passage 70a of the valve 70 and thereby drives the piston 70b in the downward direction. The piston 70b has a circumferential bore 70c which, when in the "up" position, defines a line of communication between the passage 70d and the passage 70e, the latter receiving the pipe 68. When the piston 70b is in the "down" position, the circumferential groove 70c defines a line of communication between the passage 70e and the exhaust passage 70f. Thus, when pressure is applied through pipe 44b to the passage 70a, and the piston 70b descends against the bias of spring 70g, the passage 70e, and hence, pipe 68, is connected to the atmosphere through the groove 70c and the exhaust port 70f.

It will be observed from the above that application of pressure to pipe 44 not only applies pressure through pipe 44a to the underside of piston 66a, thereby tending to lift it, but in addition, through pipe 44b, and the action of bleeder valve 70 connects the pipe 68 to the atmosphere and thereby reduces the pressure on the upper face of piston 66a to approximately atmospheric pressure.

During normal operation of the machine, the mechanism 66 is actuated to apply brake pressure when the Geneva follower 12 dwells and to relieve the brake pressure when the follower is moving. This is accomplished by alternately applying pressure to the pipes 72 and 74, respectively. When pipe 72 has pressure applied thereto, 74 is exhausting to atmosphere through the upper exhaust "EX." of the pilot valve 300, the piston 66a lifts and the brake shoe 66d (Fig. 1) is applied to the turret 11. When pipe 74 has pressure applied thereto as shown in Fig. 2, 72 is exhausting to atmosphere through the lower exhaust "EX." of the pilot valve 300, the piston 66a retracts and the brake is released.

It will be observed that the apparatus of the present invention rapidly arrests operation of the glassware making machine without interfering with the machine structure itself. Rather, only the pressure applied to the respective pilot valve 30 and the brake actuating mechanism 66 are altered. Thus, the safety mechanism may be installed in existing machines without altering their operating mechanism and may be used, or not used, on future machines in accordance with the desires of the user.

While I have shown and described a specific structure embodying the present invention, it will, of course, be understood that various alternative structures may be made without departing from the true spirit and scope of the invention. I, therefore, intend, by the appended claims, to cover all such modifications and alternative constructions which fall within their true spirit and scope.

What I claim is:

1. In a machine of the character disclosed, the combination of: a source of fluid under pressure; intermittently operated machine mechanism; a cylinder having a piston reciprocable in response to fluid pressure on one side or the other and connected to said machine mechanism to actuate the same; a pilot valve for the piston, the pilot valve having a pair of passages connected to the cylinder and is communication with the sides of the piston respectively, an exhaust port, and a control port adapted to receive fluid from said source, the pilot valve further having a movable member operable in one position to connect one of the said passages to the control port and the other of said passages to the exhaust port, and in another position to connect said one passage to the exhaust port and said other passage to the control port, fluid actuated brake actuating mechanism for said intermittently operated machine mechanism; a control valve interposed between the control port and the source, the control valve having a fluid actuated member operable upon application of fluid from said source to connect the control port to atmosphere and thereby prevent further operation of said piston by the pilot valve, and a remotely located valve operable to apply fluid pressure to the control valve to operate the same, said control valve when operated supplying fluid to said fluid actuated brake actuating mechanism to render the brake operable to stop said machine mechanism.

2. In a machine of the character disclosed, the combination of: a source of fluid under pressure; machine mechanism having means actuated by a piston reciprocably mounted in a cylinder to move in response to fluid pressure on one side or the other of the piston; a pilot valve for the piston, the pilot valve having a pair of passages connected to the cylinder and in communication with the sides of the piston respectively, an exhaust port, and a control port adapted to receive fluid from the source, the pilot valve further having a movable member operable in one position to connect one of the said passages to the control port and the other of said passages to the exhaust port and in another position to connect said one passage to the exhaust port and said other passage to the control port; a fluid operated brake actuating mechanism operable to stop said machine mechanism in the presence of applied fluid pressure and to release in the absence of fluid pressure; a control valve interposed between the control port, the brake actuating mechanism and the source and having a fluid operated member operable upon application of fluid pressure to disconnect the control port from the source and connect the brake actuating mechanism to the source; and a remotely operated mechanism operable to apply fluid from said source to the control valve to operate it.

3. A safety control system for a glass making machine having a member reciprocably operated during normal operation, a piston disposed in a cylinder to actuate the member upon application of pressure to one side or the other of the piston, and a brake actuating mechanism operable for arresting motion of said member, said brake actuating mechanism comprising: a source of fluid under pressure; a pipe to receive control fluid for arresting operation of the member; a plurality of spaced manually operable valves, each connected to the source and to the pipe and operable when actuated to apply fluid from the source to the pipe; said brake actuating mechanism being fluid operable upon application of fluid from the source; said piston being operable to actuate the member upon application of fluid from the source; and means responsive to the pressure in said pipe operable to apply fluid from the source to said fluid operable brake actuating mechanism when the pipe receives fluid from the source and to interrupt application of fluid from said source to said piston to disable said member.

4. In a machine of the class described, the combination of: a source of fluid under pressure; intermittently operated machine mechanism; a cylinder having a piston reciprocable in response to fluid pressure on one side or the other and connected to said machine mechanism to actuate the same; a pilot valve for the piston, the pilot valve having a pair of passages connected to the cylinder and in communication with the sides of the piston respectively, an exhaust port, and a control port adapted to receive fluid from said source, the pilot valve further having a movable member operable in one position to connect one of the said passages to the control port and the other of said passages to the exhaust port and in another position to connect said one passage to the exhaust port and said other passage to the control port; a fluid actuable control valve selectively operable to connect the control port of the pilot valve to the source for normal operation or to connect the control port of the pilot valve to atmosphere to arrest operation of the machine mechanism, and a plurality of remotely located trip valves each supplied with fluid pressure and normally closed, any one of said trip valves when opened supplying fluid pressure to said control valve for operating it.

5. In a machine of the class described, the combination of: a source of fluid under pressure; intermittently operated machine mechanism; a cylinder having a piston reciprocable in response to fluid pressure on one side or the other and connected to said machine mechanism to actuate the same; a pilot valve for the piston, the pilot valve having a pair of passages connected to the cylinder and in communication with the sides of the piston respectively, an exhaust port, and a control port adapted to receive fluid from said source, the pilot valve further having a movable member operable in one position to connect one of the said passages to the control port and the other of said passages to the exhaust port and in another position to connect said one passage to the control port and the other to the exhaust port; means operable to reciprocate said movable member of the pilot valve during normal machine operation to impart reciprocating motions to the piston; fluid operated brake actuating mechanism operable to restrain movement of said intermittently operated machine mechanism; and means selectively operable to connect the control port of the pilot valve to the source for normal operation or to connect the control port of the pilot valve to the actuating mechanism and disconnect the control port of said pilot control valve therefrom to arrest operation of the machine mechanism.

6. In a machine of the class described, the combination of a source of fluid under pressure, intermittently operated machine mechanism, a cylinder having a piston reciprocable in response to fluid pressure on one side or the other and connected to said machine mechanism to actuate the same, a control valve interposed between said source of fluid under pressure and said cylinder and normally permitting flow of fluid under pressure to the cylinder for reciprocating the piston therein, fluid operated brake actuating mechanism operable to restrain movement of said intermittently operated machine mechanism, said control valve having a movable element operable to discontinue the flow of fluid under pressure to said cylinder and at the same time supply fluid to said brake actuating mechanism, fluid pressure operated means for said element, and a plurality of safety valves operable to supply fluid pressure to said fluid pressure operated means, a fluid pressure line from each of said safety valves to said means, each of said safety valves being normally closed and having means operable at that time to bleed its line to atmosphere, and check valves between each of said lines and said means and opening toward said means.

References Cited in the file of this patent

UNITED STATES PATENTS

| | | |
|---|---|---|
| 588,946 | Bergman | Aug. 31, 1897 |
| 719,109 | Hanson | Jan. 27, 1903 |
| 1,252,190 | Snyder | Jan. 1, 1918 |
| 1,479,440 | Abele | Jan. 1, 1924 |
| 1,847,688 | Couwenhoven | Mar. 1, 1932 |
| 1,931,452 | Wheeler | Oct. 17, 1933 |
| 1,965,057 | Rittenhouse | July 3, 1934 |
| 2,146,482 | Miller | Feb. 7, 1939 |
| 2,330,668 | Biggs | Sept. 28, 1943 |
| 2,336,162 | Bridges | Dec. 7, 1943 |
| 2,588,166 | Sacchini | Mar. 4, 1952 |